Patented Oct. 23, 1951

2,572,002

UNITED STATES PATENT OFFICE 2,572,002

PHOTOCHEMICAL FORMATION OF BENZENE HEXACHLORIDE

Leo Berl, Chattanooga, Tenn., assignor to Tennessee Products and Chemical Corporation, Chattanooga, Tenn., a corporation of Tennessee No Drawing. Application July 11, 1950,
Serial No. 173,247

5 Claims. (Cl. 204—163)

This invention relates to making benzenehexachloride ($C_6H_6Cl_6$) having a high percentage of the gamma isomer e. g., as high as about 16.0% compared with the usual product which has a gamma content of about 8–12%.

This increased gamma content is of great importance, since it is the gamma isomer upon which the insecticidal value of the technical benzenehexachloride depends.

I have discovered that the increased gamma content is obtained by a process comprising reacting benzene and chlorine in the presence of actinic light and a nitro derivative of toluene, preferably 2,4 dinitrotoluene, maintaining the reaction temperature between 30° C. and 65° C. and discontinuing the reaction before the liquid reaction product consisting of a solution of benzenehexachloride in benzene reaches a specific gravity at which precipitation of solid benzenehexachloride may occur; namely, about 0.930 to 1.050 at 25° C. or generally stated about 1.000 at 25° C.

The addition reaction is carried out in any suitable type of reactor provided with cooling means, such as a jacket in which a cooling liquid is circulated in order to dissipate the heat of reaction. Preferably, the temperature of the reaction is maintained constantly at about 50° C.

Instead of carrying out the addition reaction batchwise as in a kettle, it may be conducted as a continuous process wherein the benzene and chlorine are reacted as described above while in counter-current flow or circulating through a cooled and irradiated system of pipes.

A solution of benzenehexachloride in benzene is obtained, substantially free of precipitated or crystallized benzenehexachloride which is introduced to a suitable still where the unreacted benzene is removed. There remains a molten mass of benzenehexachloride which is either flaked on a suitable flaking roll, cast and then broken up, or quenched with cold water.

In other cases, the chlorination solution may be pumped to a suitable crystallizer where, upon reducing the temperature, the benzenehexachloride will readily crystallize out and may be removed by filtration.

The invention will be more clearly understood by reference to the following example:

Example

About 6,000 lbs. of benzene is charged to a 1,000 gallon glass-lined, jacketed kettle equipped with agitator and light tubes for illumination. Then about 0.05% (of the weight of the benzene) of 2,4-dinitrotoluene, dissolved in benzene, is added. The liquid is then heated to about 50° C., whereupon chlorine gas is admitted. The reaction temperature is maintained at about 50° C. by suitably cooling the reactor as by the jacket. Chlorination is continued until a sample of the chlorinated liquid shows that a specific gravity of about 0.970 at 25° C. is reached. Chlorination is then discontinued by shutting off the chlorine supply and the reaction liquid, consisting of a solution of benzenehexachloride in benzene, is introduced to a still for removing the excess benzene. The molten benzenehexachloride which remains is then flaked, cast or quenched, as above mentioned.

The presence of the dinitrotoluene promotes an increase in the gamma content to about 16.0% as compared with 8 to 12% by usual processes.

While 2,4-dinitrotoluene is preferred other of the isomers of dinitrotoluene, for instance 2,6-dinitrotoluene, as well as paranitrotoluene, trinitrotoluene or mixtures of the various nitro derivatives of toluene may be used in accordance with the foregoing example.

The nitro derivatives of toluene are utilized in accordance with this invention in amount of about 0.001 to 0.3% of the weight of the benzene.

The temperature range maintained during chlorination in accordance with this invention will vary between about 30° C. to 65° C. Preferably, and as I have found, satisfactory results are obtained by maintaining the temperature constant at about 50° C.

As stated, the reaction is discontinued before the reaction liquid reaches a specific gravity at which precipitation of solid benzenehexachloride may occur. The solution thus produced is practically free from undesirable substitution products and has a gamma content substantially above the usual 12%.

I claim:

1. The process of forming benzenehexachloride in benzene solution, comprising reacting benzene and chlorine under irradiation by actinic light and in admixture with a nitrotoluene, the amount of the nitrotoluene being between about 0.001 to 0.3% of the benzene and the reaction being carried out at a temperature between about 30° to 65° C.

2. The process according to claim 1 wherein the nitrotoluene is 2,4 dinitrotoluene.

3. The process according to claim 1 wherein the nitrotoluene is 2,6 dinitrotoluene.

4. The process according to claim 1 wherein the nitrotoluene is trinitrotoluene.

5. The process according to claim 1 wherein the nitrotoluene is paranitrotoluene.

LEO BERL.

REFERENCES CITED

The following references are of record in the file of this patent:

FOREIGN PATENTS

| Number | Country | Date |
|---|---|---|
| 586,442 | Great Britain | Mar. 19, 1947 |